United States Patent [19]

van der Lely

[11] 4,003,438
[45] Jan. 18, 1977

[54] CULTIVATOR

[76] Inventor: Cornelis van der Lely, 7, Bruschenrain, Zug, Switzerland

[22] Filed: Feb. 13, 1975

[21] Appl. No.: 549,531

[30] Foreign Application Priority Data

Feb. 15, 1974 Netherlands ............... 7402069

[52] U.S. Cl. .................... 172/59; 172/49; 172/68; 172/438; 172/769; 172/766; 172/773; 172/741; 111/77
[51] Int. Cl.² ................. A01B 33/06; A01B 33/16
[58] Field of Search ............ 172/59, 713, 714, 98, 172/123, 49, 99

[56] References Cited
UNITED STATES PATENTS

| 231,637 | 8/1880 | Wilcox | 172/713 |
|---|---|---|---|
| 3,137,350 | 6/1964 | Horr | 172/123 X |
| 3,897,831 | 8/1975 | van der Lely | 172/59 X |
| 3,902,560 | 9/1975 | van der Lely | 172/59 |

Primary Examiner—George J. Marlo
Attorney, Agent, or Firm—Mason, Mason & Albright

[57] ABSTRACT

A cultivator or harrow has two groups of tined soil working members in a row that are driven to rotate about upwardly extending shafts. Each group is located on an opposite side of a frame portion center from the other. Between each soil working member, a driving shaft is positioned and pinion gears housed in the frame portion to turn all the shafts of one group in the same direction, but opposite to that of the driving shafts and the other group. The driving shafts can be fitted with additional soil working members and those soil working members on upwardly extending shafts can be replaced with smaller supports so that adjacent soil working members rotate in opposite directions. Alternatively, the smaller supports can be fitted with extension structures and two groups of soil working members are again formed. A dispensing mechanism can be mounted on the frame portion to deliver material between a rear supporting roller and the tines.

10 Claims, 5 Drawing Figures

CULTIVATOR

An object of the invention is the provision of a harrow which will function in a first mode of operation to bring soil to a coarsely broken condition suitable for over-wintering and in a second alternative mode of operation in which it will produce a soil consistency suitable for seed sowing and the introduction of small plants. A further object of the invention is the provision of a power-operated cultivator which will work in the first mode of operation without excessive noise.

Figure 1:
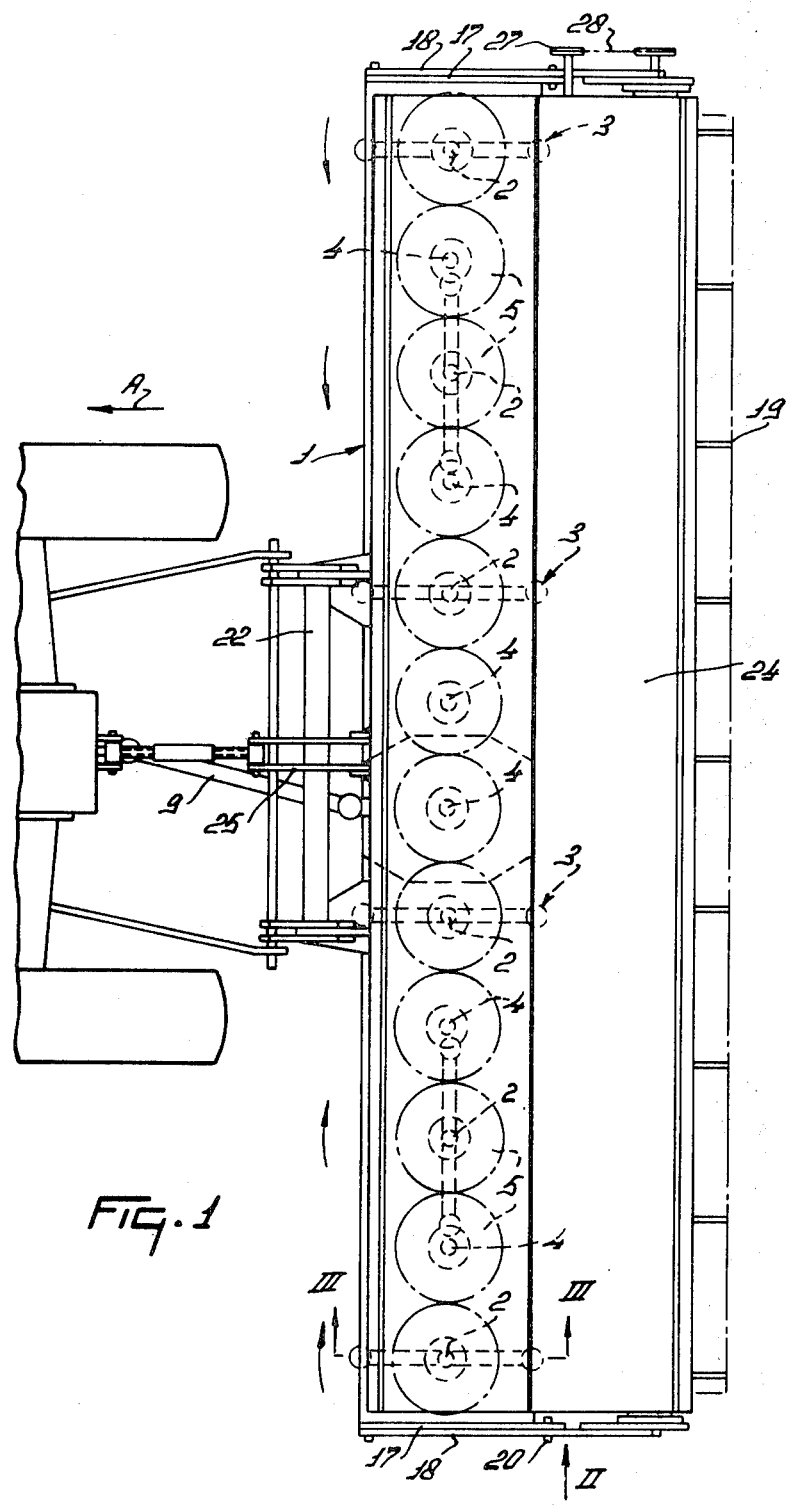
Figure 2:
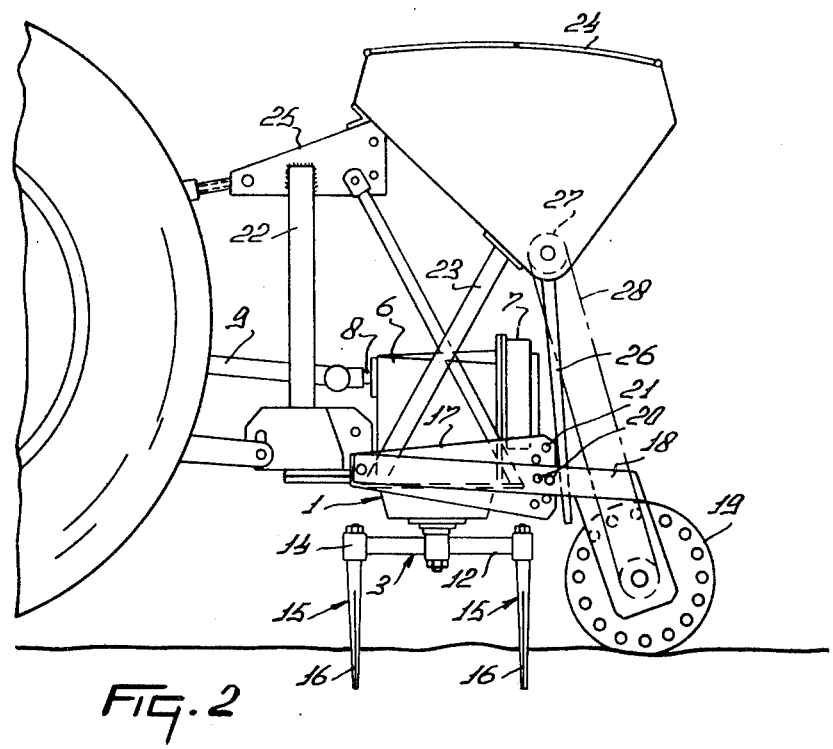
Figure 3:
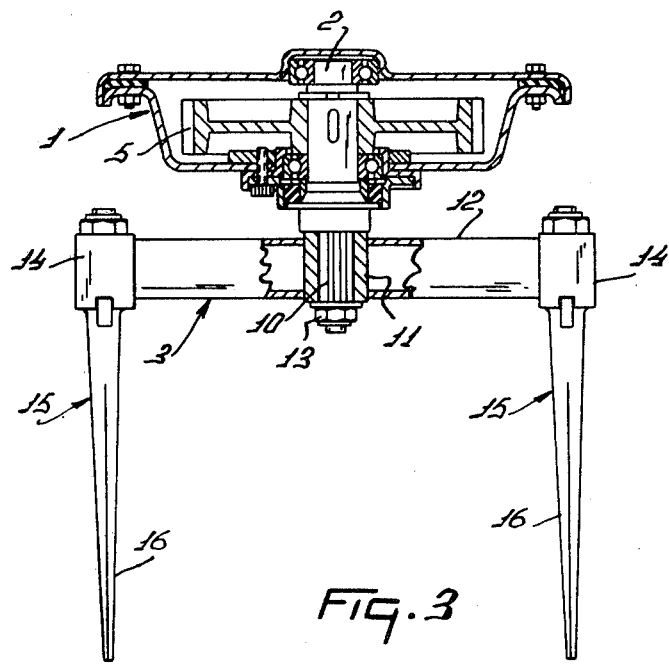
Figure 4:
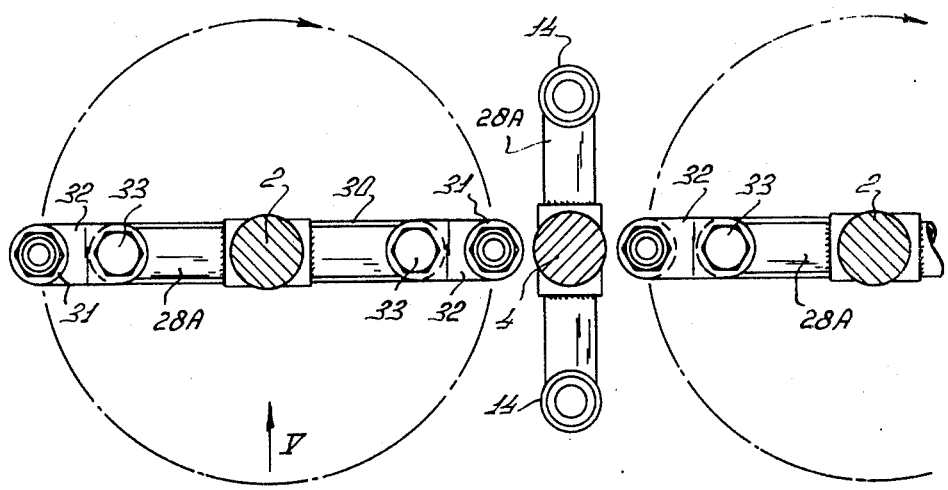
Figure 5:
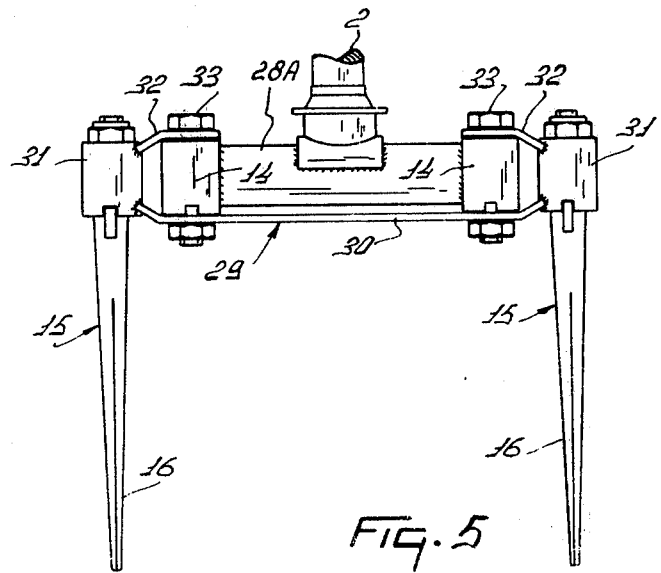

For a better understanding of the invention, and to show how the same may be carried into effect, reference will now be made, by way of example, to the accompanying drawings, in which:

FIG. 1 is a plan view of a cultivator or soil cultivating implement in accordance with the invention connected to the rear of an agricultural tractor, FIG. 2 is a side elevation as seen in the direction indicated by an arrow II in FIG. 1, FIG. 3 is a section, to an enlarged scale, taken on the line III—III in FIG. 1, FIG. 4 is a sectional plan view, to the same scale as FIG. 2, illustrating the construction and arrangement of alternative soil working members of the cultivator, and FIG. 5 is an elevation as seen in the direction indicated by an arrow V in FIG. 4.

Referring to the drawings, the cultivator or soil cultivating implement that is illustrated, and which could also be considered as being a rotary harrow, has a hollow box-shaped frame portion 1 that extends substantially horizontally transverse, and normally substantially horizontally perpendicular, to the intended direction of operative travel of the cultivator which is indicated by an arrow A in FIG. 1 of the drawings. The hollow frame portion 1 accommodates six vertical or substantially vertical shafts 2 that are arranged in two groups at opposite sides of the center of the frame portion 1. Each group comprises three of the shafts 2 disposed in regularly spaced apart relationship. Each shaft 2 affords the axis of rotation of a corresponding soil working member or soil working rotor 3 that is secured to a lower portion of the corresponding shaft 2 that projects from beneath the bottom of the frame portion 1. In addition to the six shafts 2, there are six vertical or substantially vertical driving shafts 4 which are parallel to the shafts 2 and that are arranged, with the shafts 2, in a single row, the shafts 2 and 4 in that row being in regularly spaced apart relationship. Each of the shafts 2 and driving shafts 4 is provided, inside the hollow frame portion 1, with a corresponding straight- or spur-toothed pinion 5 and it will be seen from FIG. 1 of the drawings that each pinion 5 has its teeth in mesh with those of its neighbour, or each of its neighbours, in the single row thereof. The shafts at the opposite ends of the single row thereof are shafts 2 affording the axes of rotation of corresponding soil working members 3 and, consequently, the center pair of shafts of the row are both driving shafts 4 (see FIG. 1). The two groups which each comprise three shafts 2 and three corresponding soil working members 3 are thus spaced apart from one another in a direction transverse to the direction A.

One of the center pair of driving shafts 4 has an upward extension into a gear box 6 that is mounted on top of the hollow frame portion 1. There are two shafts within the gear box 6 both of which extend substantially horizontally parallel to the direction A in vertically spaced relationship. Meshing bevel pinions place the lower one of those shafts (not visible in the drawings) in driving connection with the upward extension of one of the shafts 4 and the rearmost ends of both substantially horizontal shafts project into a change-speed gear 7 mounted at the back of the gear box 6. Said ends are splined or otherwise keyed and chosen pairs of interchangeable and/or exchangeable meshing pinions can be releasably mounted on said ends to give corresponding transmission ratios between the two shafts. The upper shaft has an end 8 that projects forwardly in substantially the direction A from the front of the gear box 6 and said end 8 can be placed in driven connection with the power take-off shaft of an agricultural tractor or other operating vehicle through the intermediary of a telescopic transmission shaft 9, which is of a construction that is known per se, having universal joints at its opposite ends. Different speeds of rotation of the soil working members 3 can thus be attained, to match the operating circumstances, without altering the input speed of rotation applied to the shaft end 8 merely be selecting appropriate pinions for cooperation inside the changespeed gear 7.

As previously mentioned, the shafts 2 and 4, are arranged in regularly spaced apart relationship in the single row thereof and it is preferred that the distance between them should have a magnitude of substantially 25 centimeters (9.8 inches). The shafts 2 that afford the axes of rotation of corresponding soil working members 3 project from beneath the bottom of the frame portion 1 and part of the length of each downwardly projecting portion is formed with splines 10 (FIG. 3). These splines 10 cooperate with matching internal splines in the bore of a cylindrical boss 11 to maintain that boss fast in rotation with the corresponding shaft 2. The boss 11 is located centrally along the length of a tine support 12 of the corresponding soil working member 3 and is fixed in position axially on the splined portion of the corresponding shaft 2 by a nut 13 that co-operates with a short screwthreaded portion of the shaft 2 located beneath the splined portion thereof. A split pin or the like (not shown) may be provided to ensure that the nut 13 does not work loose during operation of the cultivator. The opposite ends of the tine support 12 carry corresponding substantially cylindrical tine holders 14 whose longitudinal axes are substantially parallel to the longitudinal axis of the central bore of the boss 11. The tine holders 14 receive upper fastening portions of corresponding rigid soil working tines 15 each of which tines includes a downwardly tapering active or soil working portion 16. The opposite ends of the hollow frame portion 1 carry substantially vertical sector plates 17 that extend substantially parallel to the direction A. Arms 18 are turnable upwardly and downwardly alongside the sector plates 17 about a substantially horizontal axis afforded by strong aligned pivots that are located at the top and front of the frame portion 1 with respect to the direction A. The arms 18 project rearwardly with respect to the direction A from their pivotal mountings, their rearmost ends being provided with downward extensions between which a rotatable supporting member in the form of a ground roller 19 is mounted. Each arm 18 is formed with a single hole between its opposite ends and that hole can be brought into register with any chosen hole in a curved row of holes 21 formed in a rear region of the corresponding sector plate 17 at equal distances from the axis about which the arms 18 are pivotable. Horizontal locking pins or bolts 20 can then be entered through the single holes in the arms 18 and the chosen holes 21 to retain the arms 18 in corresponding angular settings relative to the frame portion 1. It will be realised that the chosen setting determines the level of the axis of rotation of the ground roller 19 relative to the level of the remainder of the cultivator and that this setting is a principal factor in determining the depth of penetration of the tines 15 of the soil working members 3 into the ground during the operation of the cultivator. A central region of the front of the hollow frame portion 1 is provided with a coupling member or trestle 22 that is of generally triangular configuration and that coupling member or trestle 22 can be employed, in the basically known manner which is illustrated in FIGS. 1 and 2 of the drawings, in connecting the cultivator to the three-point lifting device or hitch at the rear of the agricultural tractor or other vehicle which moves and operates the cultivator during the use of the latter.

Supports 23 (FIG. 2) project upwardly from the frame portion 1 in spaced apart relationship and, in conjunction with a pair of upper plates 25 of the coupling member or trestle 22, carry a hopper 24 that extends substantially parallel to the length (transverse to the direction A) of the frame portion 1 throughout substantially the whole of the working width of the cultivator. The hopper 24 forms part of a mechanism for supplying material onto and/or into soil worked by the cultivator which mechanism, in the embodiment illustrated by way of example, also includes a plurality of delivery tubes 26 that extend downwardly from the bottom of the hopper 24 to open at a level which is substantially the same as that of the tops of the soil working members 3 and at a position, with respect to the direction A, between the soil working members 3 and the ground roller 19. The delivery tubes 26 could be extended downwardly to terminate in coulters arranged to sow seeds in rows extending substantially parallel to the direction A. The hopper 24 may thus contain materials such as seeds, powdered or granular artificial fertilisers and other materials such as pesticides or herbicides that it is required should be supplied onto and/or into the soil. A rotatable delivery member 27 extends through the hopper 24 immediately above the bottom thereof to control the rate of delivery of material from the hopper 24 to the tubes 26. The rotatable delivery member 27 is driven from the ground roller 19 by way of a transmission chain 28 that cooperates with sprocket wheels located at one end of the roller 19 and at the corresponding end of the delivery member 27. The chain drive which includes the transmission chain 28 is shown only in outline in the drawings and, in practice, will incorporate means to enable the length of the chain 28 to be effectively increased or reduced to compensate for any adjustments in the level of the axis of rotation of the roller 19 that may be made in the manner which has been described above.

In the use of the cultivator that has been described, its coupling member or trestle 22 is connected to the three-point lifting device or hitch at the rear of an agricultural tractor or other operating vehicle and the soil working members 3 of the two groups thereof are caused to rotate at a speed appropriate to the nature and condition of the soil and the form of preparation thereof that is required by placing the shaft end 8 in driven connection with the power take-off shaft of the same tractor or other operating vehicle with the aid of the telescopic transmission shaft 9. It will be remembered that there are two separate groups of the soil working members 3 and it will be seen from FIG. 1 of the drawings that each of the three members 3 of one group rotates in one direction while each of the three members 3 of the other group rotates in the opposite direction (see the arrows in FIG. 1 of the drawings). Each soil working member 3 works a corresponding strip of ground that extends parallel to the direction A and that is closely adjacent, if not actually adjoining, one or two strips of the ground worked by one or both members 3 of the other group thereof. Since all the soil working members 3 of one group rotate in the same direction, the soil is forcibly torn by the tines 15 and is left in a coarsely broken condition which, while not suitable for seed sowing or the insertion of small plants, is ideal for over-wintering to allow frost to exert its natural crumbling effect upon the coarse lumps of soil.

The cultivator can readily be changed over to an alternative mode of operation in which it will produce a finely crumbled soil structure that is suitable for the introduction of seeds or small plants. To this end, in the example which is being described, each driving shaft 4 is of similar construction to each rotor shaft 2 and thus projects from beneath the bottom of the frame portion 1 in the same manner as is illustrated for one of the shafts 2 in FIG. 3 of the drawings. To bring about the change in mode of operation that has just been mentioned, the nuts 13 are loosened and the supports 12 are removed from the rotor shafts 2. Subsequently, all twelve of the shafts 2 and 4 are provided with alternative tine supports 28A (FIG. 4) that are of shorter length than the supports 12. With this working arrangement, the tine holders 14 at the opposite ends of the supports 28A receive the fastening portions of the tines 15 and each of the twelve soil working members works a corresponding strip of soil, said strips overlapping one another to produce a single broad strip of worked soil because the distances between the free ends or tips of the active or soil working portions 16 of the two tines 15 of each member 3 are slightly greater than the distances between the neighbouring shafts 2 and/or 4. Due to the arrangement of the pinions 5, each soil working member 3 rotates in the opposite direction of its neighbour, or to both of its neighbours, in the single row thereof in the mode of operation that is under consideration. The mechanism for supplying material into and/or into the soil can advantageously be used simultaneously when the cultivator is arranged to produce finely crumbled soil, it being possible to add artificial fertiliser and/or seeds and/or other materials to the soil at the same time as the cultivating operation takes place thus avoiding the need for a further operation with a separate agricultural implement.

If the cultivator is provided with twelve soil working members or soil working rotors 3, each of which incorporates a tine support 28A and corresponding tines 15 as discussed in the preceding paragraph, it can readily be brought to a mode of operation in which there are groups of the soil working members 3 and the driving shafts 4 are not provided with soil working members. After removing the soil working members 3 from the shafts 4 which are to serve only as driving shafts, the remaining tine supports 28A have their tines 15 temporarily removed and those supports are then provided with corresponding supporting structures 29 (FIGS. 4 and 5) by whose use the tines 15 can be arranged at greater distances from the axes of the shafts 2 than is possible with the supports 28A and their tine holders 14 alone. Each supporting structure 29 comprises a substantially rigid strip 30 whose opposite ends have secured to them tine holders 31 that are similar to the time holders 14 but that are spaced apart from one another by a greater distance than are the tine holders 14. The two tine holders 31 that correspond to each strip 30 each carry, at the upper end thereof, a corresponding shorter strip 32 that extends from the holder 31 concerned towards the central driving shaft 2 and thus in the same direction as the strip 30 when viewed lengthwise of the shaft 2 (see FIG. 4). The ends of the shorter strips 32 that are closest to the shafts 2 and aligned locations on the strip 30 are formed with holes and these holes register with the upper and lower ends of the bores through the tine holders 14. Upon entering bolts 33 through the holes in the strips 30 and 32, and through the bores in the holders 14, each supporting structure 29 can be firmly, but releasably, retained in its appointed operative position, its holders 31 being disposed to receive the fastening portions of the tines 15 in the same manner as do the holders 14. By changing the mode of operation of the cultivator in the manner which has been described, it can be brought from a working position in which it will form a single broad strip of soil that is ready, or substantially ready, for seed sowing or the introduction of small plants to an alternative working position which is suitable for coarse soil breaking and in which there are two spaced groups of soil working members in each of which groups all of the soil working members rotate in the same direction which direction is the opposite direction to that in which the soil working members of the other group revolve. This arrangement involves the shafts 4 functioning as driving shafts which do not themselves carry soil working members. It will be evident from a study of FIG. 1 of the drawings that the two strips of land that are worked by the separate groups of soil working members in the mode of operation that has just been discussed substantially adjoin one another midway across the width of the cultivator so that there is normally no gap between the two strips bearing in mind that the soil is coarsely broken up in this mode of operation.

Although soil displacing elements in the form of the tines 15 will normally be provided, it is within the scope of the invention to employ alternative soil displacing elements for some specialised cultivating operations such, purely for example, as rigid or semi-resilient blades and the like. Whatever soil displacing elements are employed for co-operation with the holders 14 and/or 31, the cultivator can readily be brought from one mode of operation to the other, as described above, the original mode of operation being quickly recoverable merely by reversing the change-over procedure.

Although various features of the cultivator that has been described and/or that is illustrated in the accompanying drawings will be set forth in the following claims as inventive features, it is emphasised that the invention is not necessarily limited to those features and that it includes within its scope each of the parts of the cultivator that has been described and/or that is illustrated in the accompanying drawings both individually and in various combinations.

I claim:

1. A cultivator implement comprising a plurality of soil-working members positioned side by side in a row that extends transverse to the normal direction of travel of the implement, each soil-working member being rotatable about a respective upwardly extending shaft means mounted on an elongated frame portion, said soil-working members being arranged in two groups and a first group being located on a lateral side of the center of said frame portion opposite from a second group, a drive transmission being connected to the shaft means of said soil-working members to rotate all of the members of said first group in the same direction and in a direction opposite to the direction of rotation of all members of said second group, said drive transmission comprising at least one neighboring driving shaft interposed between the shaft means of adjacent soil-working members of both groups, said soil-working members each having downwardly extending soil-displacing elements positioned to work soil across the width of said row, each soil-working member comprising at least one soil-displacing element having a lower tip that is spaced from the respective shaft means and positioned to trace a substantially circular path having a diameter substantially twice the perpendicular distance between the shaft means of that soil-working member and the axis of rotation of the neighboring interposed driving shaft.

2. A cultivator according to claim 1, wherein said row contains the axes of rotation of said soil-working members as defined by said respective shaft means and the axes of rotation defined by the driving shafts interposed between said shaft means.

3. A cultivator according to claim 2, wherein neighboring axes of rotation of said members and said driving shafts are spaced apart from one another by substantially equal spaces and said spaces are about 25 centimeters in length.

4. A cultivator according to claim 1, wherein said drive transmission comprises a plurality of intermeshing toothed pinions and each of said pinions is rotatable about a substantially vertical axis.

5. A cultivator according to claim 4, wherein said elongated frame portion houses said toothed pinions, said shaft means and driving shafts being journalled in said frame portion.

6. A cultivator according to claim 1, wherein there are two substantially central driving shafts located between said two groups of soil-working members and said two central driving shafts are located one on either side of said center.

7. A cultivator according to claim 6, wherein one of said two driving shafts is coupled to an imput shaft that is drivenly connected to a power take-off of a prime mover via an extension of that one driving shaft into a gear box on said frame portion, said gear box including a change-speed gear.

8. A cultivator according to claim 1, wherein each soil-working member is detachably secured to a shaft of said shaft means and each soil-working member includes an elongated support that extends substantially perpendicular to the longitudinal axis of the driving shaft, auxiliary supporting structures being connected to ends of said supports, the soil-displacing elements of each member being mounted on the corresponding structure at a greater distance from the corresponding axis of rotation than the ends of that support.

9. A cultivator according to claim 8, wherein said auxiliary supporting structures are connected to soil displacing element holders on the ends of said supports and said holders are located at the ends of said supports.

10. A cultivator according to claim 9, wherein said structures each comprise a lower strip that coextends with the corresponding support, laterally beyond the ends thereof, and an upper shorter strip at each end of that support, the outer ends of the strips being fastened to a further holder at each end of the support and said strips interconnecting said holders with the further holders.

* * * * *